(12) United States Patent
Henson et al.

(10) Patent No.: US 7,504,985 B2
(45) Date of Patent: Mar. 17, 2009

(54) MULTI-DIMENSIONAL REAL-ARRAY RADAR ANTENNAS AND SYSTEMS STEERED AND FOCUSED USING FAST FOURIER TRANSFORMS

(75) Inventors: James M. Henson, Reno, NV (US); Ross P. Kohlmoos, Reno, NV (US)

(73) Assignee: Board of Regents of the Nevada System of Higher Education on Behalf of the University of Nevada, Reno, Reno, NV (US)

( * ) Notice: Subject to any disclaimer, the term of this patent is extended or adjusted under 35 U.S.C. 154(b) by 158 days.

(21) Appl. No.: 11/601,322

(22) Filed: Nov. 16, 2006

(65) Prior Publication Data

US 2007/0132631 A1 Jun. 14, 2007

Related U.S. Application Data

(60) Provisional application No. 60/737,792, filed on Nov. 17, 2005.

(51) Int. Cl.
*G01S 13/90* (2006.01)
(52) U.S. Cl. .................. 342/25 R; 342/25 A; 342/194; 342/196; 342/179; 342/180; 342/191; 342/192
(58) Field of Classification Search ............... 342/25 R, 342/25 A–25 F, 179, 180, 190–197
See application file for complete search history.

(56) References Cited

U.S. PATENT DOCUMENTS

| | | | | |
|---|---|---|---|---|
| 5,132,693 A | * | 7/1992 | Werp | 342/179 |
| 5,170,171 A | * | 12/1992 | Brown | 342/191 |
| 5,260,708 A | * | 11/1993 | Auterman | 342/25 C |
| 6,400,306 B1 | * | 6/2002 | Nohara et al. | 342/25 R |
| 7,436,348 B2 | * | 10/2008 | Nohmi | 342/25 R |
| 2005/0179585 A1 | * | 8/2005 | Walker et al. | 342/134 |
| 2006/0262004 A1 | * | 11/2006 | Buck | 342/25 A |
| 2007/0109177 A1 | * | 5/2007 | Baath et al. | 342/124 |
| 2007/0132631 A1 | * | 6/2007 | Henson et al. | 342/25 R |

* cited by examiner

FOREIGN PATENT DOCUMENTS

JP 58223770 A * 12/1983

OTHER PUBLICATIONS

Fenn, et al., "The Development of Phased-Array Radar Technology," *Lincoln Laboratory Journal*, vol. 12, No. 2, pp. 321-340, 2000.

*Primary Examiner*—John B Sotomayor
(74) *Attorney, Agent, or Firm*—Klarquist Sparkman, LLP

(57) ABSTRACT

Radar systems are disclosed that include a signal generator, an antenna, a switching circuit, an I/Q sampling and signal-demodulation (demodulation) processor, and a FFT processor. The signal generator produces energization signals. The antenna has multiple individual antenna elements. The switching circuit is configured to deliver the energization signals to a selected antenna element at a respective moment in time to cause the selected antenna element to transmit a respective radar signal in response to the energization signal. At least one element receives a corresponding return-radar signal before the switching circuit selects a next antenna element to transmit a respective radar signal. The demodulation processor receives the return-radar signals from the antenna elements and demodulates the return-radar signals. The FFT processor fast-Fourier transforms the return-radar signals. The system can include a magnitude processor that determines, from the Fourier transforms, respective magnitudes of the return signals in at least one data plane. The system also can include an imager.

36 Claims, 4 Drawing Sheets

MULTI-DIMENSIONAL REAL-ARRAY RADAR ANTENNAS AND SYSTEMS STEERED AND FOCUSED USING FAST FOURIER TRANSFORMS

CROSS REFERENCE TO RELATED APPLICATION

This application claims the benefit of co-pending U.S. Provisional Application No. 60/737,792, filed on Nov. 17, 2005, and incorporated herein by reference in its entirety.

FIELD

This disclosure relates to radar systems, radar-signal processing, and radar-antenna arrays. More specifically, the disclosure is directed to, inter alia, radar antennas comprising multiple array elements that, instead of being driven in a phase-modulated manner to steer the radio waves produced by the array, are driven sequentially and individually.

BACKGROUND

Radar is a system that uses radio waves to detect, to determine the direction and distance and/or speed of, and to map objects such as aircraft, ships, terrain, or atmospheric precipitation. In a conventional radar system, a transmitter emits radio waves toward a target. The waves reflected by the target back toward the transmitter are detected by a receiver. The receiver typically is in the same location as the transmitter. Although the returned radio signal is usually very weak, radio signals can easily be amplified. Consequently, radar can detect objects at ranges where other emissions, such as sound or visible light, would be too weak to detect. Radar is used in many contexts, including meteorological detection of precipitation, air-traffic control, police detection of speeding ground traffic, as well as various military applications.

The term "RADAR" was coined in 1941 as an acronym for Radio Detection and Ranging. This acronym, of American origin, replaced the previously used British abbreviation "RDF" (Radio Direction Finding). The term has since entered the English language as a generic word, "radar," that has lost its original capitalization.

One way in which to measure the distance to an object is to transmit a short pulse of radio signal, and to measure the time elapsed for the reflection to return. The distance is one-half the product of round-trip time (because the signal has to travel to the target and then back to the receiver) and the velocity of the signal. This concept was exploited in certain early radars. Since velocity of the signal is the velocity of light, the round-trip time is very short for terrestrial ranging.

Another form of distance-measuring radar is based on frequency modulation. Frequency comparison between two radio signals is considerably more accurate, even with older electronics, than timing the returned signal. By changing the frequency of the returned signal and comparing with the frequency of the transmitted signal, the difference is easily determined. An example is a chirp-radar system, in which the frequency of the transmitted signal is linearly increased during the period of transmission. The chirped signal provides increased signal bandwidth, which is directly proportional to range resolution, i.e., the ability of the system to discriminate between closely spaced targets in the range dimension. Greater bandwidth generally yields higher (better) range resolution.

An "antenna array" in the radar context comprises multiple individual active antennas (antenna "elements") coupled to a common source or load to produce a directed radiation pattern. Usually, the spatial relationship of the elements in the antenna array contributes to the directivity of the antenna array. The term "active antenna" pertains to an antenna having constituent antenna elements of which the respective energy outputs are modified. Modification of the energy output by an element is usually achieved by coupling the element to an energy source that is other than the mere signal energy passing through the circuit including the antenna element. Another way of achieving modification of the energy output by an element is by coupling the antenna element to a source of energy having an output that is controlled by the signal input. In a phased array of antenna elements, the relative amplitudes of, and constructive and destructive interference effects among, the signals radiated by the antenna elements determine the effective radiation pattern produced by the array. A phased array may be used to point (steer) a fixed radiation pattern, or to scan rapidly in azimuth or elevation.

Antenna arrays are used in several types of radars. One type is called Active Electronically Scanned Array (AESA) radar, also known as an active phased-array radar. In an AESA radar system, the transmitter and receiver functions are performed by numerous small transmit/receive (T/R) modules that are connected to respective antenna elements and that energize the elements simultaneously. Since each element is energized by a respective RF source, the elements are "active." Another type is called Passive Electronically Scanned Array (PESA) radar, in which a microwave-feed network in the rear of the antenna is powered by a single radio-frequency (RF) source (magnetron, klystron, traveling-wave tube (TWT), or the like). The single RF source sends its waves simultaneously to multiple phase-shift modules that are coupled to respective antenna elements and that energize the elements simultaneously. The phase-shift modules are usually digitally controlled. Since the antenna elements do not receive their RF energy directly from respective modules, the elements are "passive."

AESA radar systems do not have or utilize a traditional RF source (in the common meaning of the term, including a magnetron, a klystron, a TWT, or the like). These traditional RF sources usually require extremely high operating voltages (reaching 50 kVa). Rather, individual AESA elements create electromagnetic waves using devices such as gallium-arsenide modules that operate at relatively low voltage (e.g., 40-60 volts). In addition, AESA radar systems tend to have simpler mechanical designs and tend to be more compact than other radar systems.

Unfortunately, however, both AESA and PESA antenna arrays require the use of electronic phase shifters, one for each antenna element. This poses the requirement for many electronic units that should remain in a functional state during operation of the radar. Whereas having a large number of independently driven antenna elements provides some accommodation for failures of individual phase shifters and/or antenna elements, the large amount of electronics inevitably increases the probability of failure somewhere.

Synthetic aperture radar (SAR) is a type of radar system in which sophisticated post-processing of radar data is used to produce a very narrow effective beam. SAR can only be used by moving the radar system over a relatively immobile target. Nevertheless, SAR has seen wide applications in remote sensing and mapping. In a typical SAR application, a single radar antenna is attached to the side of an aircraft or the like. A single pulse from the antenna array is rather broad (several degrees) because diffraction requires a large antenna to produce a narrow beam. The pulse also is broad in the vertical direction; often the pulse will illuminate the terrain from directly beneath the aircraft out to the horizon. If the terrain is approximately flat, the respective times at which echoes return allow points at different distances from the flight track to be distinguished from one another. Distinguishing points along the track of the aircraft is difficult using a small antenna array. However, if the amplitude and phase of the signal returning from a given piece of ground are recorded, and if the aircraft emits a series of pulses as it travels, then the results from these pulses can be combined. Effectively, the series of observations can be combined just as if they had all been made simultaneously from a very large, one-dimensional, linear-array antenna; this process creates a synthetic aperture that is much larger than the length of the physical antenna array (and in fact much longer than the aircraft itself).

In SAR, combining a series of radar observations requires significant computational resources. Computations are normally performed at a ground station, after the observations are complete, using Fourier transform techniques. The result is a two-dimensional, reflectivity image of range versus cross range.

A variation of SAR is Inverse Synthetic Aperture Radar (ISAR), which exploits motion of the target (rather than of the radar) to synthesize a large-aperture antenna. ISAR is also used for generating two-dimensional high-resolution images of targets. In situations in which other radars display only a single unidentifiable bright moving pixel of an image, an ISAR image can often discriminate between various missiles, military aircraft, and civilian aircraft. One can generate a high-resolution image of a stationary object by moving an SAR around the object. Alternatively, one can generate the same image using a stationary radar and rotating the object. If the target rotates by a small amount, the rotation has the same effect as if the radar had traveled a distance equal to the arc length at the range R. ISAR can be used for identifying the reflectivity centers of a target with high spatial resolution. A fine two-dimensional reflectivity map of the target is generated using a large-bandwidth transmitted signal to achieve high range resolution and coherently processing the echoes received from different aspect angles of the target. ISAR images of a target region also can be useful for locating scattering regions on the target. ISAR images of a rotating target are produced by processing the resultant doppler histories of the scattering centers on the target. If the target rotates in azimuth at a constant rate through a small angle, scatters will approach or recede from the radar at a rate depending only on the cross-range position (the distance normal to the radar line of sight with the origin at the target axis of rotation). The target rotation will result in the generation of cross-range-dependent doppler frequencies that can be sorted by a one-dimensional Fourier transform. This operation is equivalent to the generation of a large synthetic-aperture antenna formed by the coherent summation of the receiver outputs for varying target/antenna geometries.

3D radar provides radar coverage in three dimensions. Whereas 2D radar provides range and azimuth data, 3D radar provides data concerning range, azimuth, and elevation. Applications include weather forecasting, defense, and surveillance.

While the various conventional radar systems summarized above have numerous advantages, including those noted, their advantageous status is not universal. For example, phased-array radar systems are expensive and complex from both an electronics and signal-processing point of view. With respect to electronics, the need to provide respective phase shifters and control electronics for each element contributes substantially to cost and complexity. With respect to signal processing, during beam steering all the antenna elements in the array are excited simultaneously in the transmit mode. Meanwhile, the phase shifters are continuously energized in a controlled manner to adjust the respective phase of the signal produced by each antenna element. Synthetic aperture radars are limited by, inter alia, having to be mounted on an object (typically an airplane) moving in a controlled manner relative to the target. Also, synthetic aperture radars are not capable of forming three-dimensional images or data.

SUMMARY

According to one aspect, single- or multi-dimensional "real" (actual physical, in contrast to "synthetic") radar-antenna arrays are provided. An embodiment comprises an array of multiple antenna elements such as dipole or other elements. The array can be one-dimensional (arranged in a linear manner) or multi-dimensional (e.g., arranged in a planar or three-dimensional manner, an example of the latter being a section of a sphere). The antenna arrays comprise transmission- and return-signal-processing electronics that operate the elements as if the elements were synthetic space-time arrays. But, in contrast to SAR or phased-array radar ssystems, each element is energized individually (without the use of electronic phase shifters) and receives respective scattered signals as if the other array elements were not present. Thus, use of multiple individual electronically controlled phase-shifters to steer and/or focus the antenna array is unnecessary. Rather, the array is quickly, easily, and inexpensively steered and focused (mathematically), at least approximately, using a one- or two-dimensional Fourier transform. This can be accomplished using an inexpensive digital-signal processing (DSP) chip. The transform is applied to the complex range-resolved signal data associated with each antenna element in the physical array.

Alternatively, the array can be precisely steered/focused by applying the exact mathematical phase-corrections to the received signals from each of the array elements. (This type of processing is similar to that used in connection with one-dimensional Inverse Synthetic Array Radar (ISAR) signal processing.) ISAR systems employ a single stationary antenna and depend upon linear or rotational motion of the target as a function of time to mimic the formation of a one-dimensional array. Various embodiments of the present invention utilize a one- or two-dimensional antenna array to mimic motion of the antenna elements with respect to the target.

An exemplary embodiment of a radar system comprises a signal generator, an antenna, a switching circuit, an I/Q sampling and signal-demodulation processor, and a fast Fourier-transform (FFT) processor. The signal generator is configured to produce energization signals. The antenna comprises an array of multiple individual antenna elements. The switching circuit is connected to the signal generator and to the antenna elements and is configured to deliver the energization signals selectively to individual antenna elements at different respective points in time. Thus, each energized antenna element transmits a respective radar signal and receives a corresponding return-radar signal before the next antenna element transmits its respective radar signal. The I/Q sampling and signal-demodulation processor is connected so as to receive the return-radar signals from the antenna elements and is configured to demodulate the return-radar signals. The FFT processor is connected to the I/Q sampling and signal-demodulation processor and is configured to perform fast Fourier transforms of the return-radar signals. The system can include a magnitude processor connected to the FFT processor and configured to determine, from the Fourier transforms, respective magnitudes of the return signals in at least one (iso-range) data plane. The system also can include an imager that is connected to the magnitude processor. The imager can be configured to receive at least one data plane from the magnitude processor and to produce therefrom an image.

Another aspect is directed to methods for performing "radar" (radio detection and ranging). An embodiment comprises generating a series of respective energization signals at different respective points in time. The energization signals are delivered selectively to individual respective antenna elements in an array of such elements to cause the energized antenna elements to transmit the respective radar signals at the respective points in time. Return-radar signals are received by the individual antenna elements, wherein each return-radar signal is received before a next antenna element transmits its respective radar signal. The return-radar signals are subjected to I/Q sampling and demodulation. Fourier transforms are performed of the demodulated return-radar signals. The Fourier-transformed return-radar signals can be imaged and/or used in a control manner such as providing feedback to a system or mechanism.

Yet another aspect is directed to radar antennas. An embodiment of same comprises an arrangement of multiple individual antenna elements. The embodiment also comprises a signal generator that produces a current signal sufficient to cause any of the antenna elements to transmit a radar signal. The embodiment also comprises a switching circuit that is connected between and to the signal generator and the antenna elements. The signal generator is configured to switch the current signal from the signal generator in a manner by which each antenna element receives a respective energization current at a respective moment in time and receives a corresponding return-radar signal before the next antenna element is energized.

The foregoing and other features and advantages of the invention will be more readily apparent from the following detailed description, which proceeds with reference to the accompanying drawings.

DETAILED DESCRIPTION

First Representative Embodiment

Figure 1:
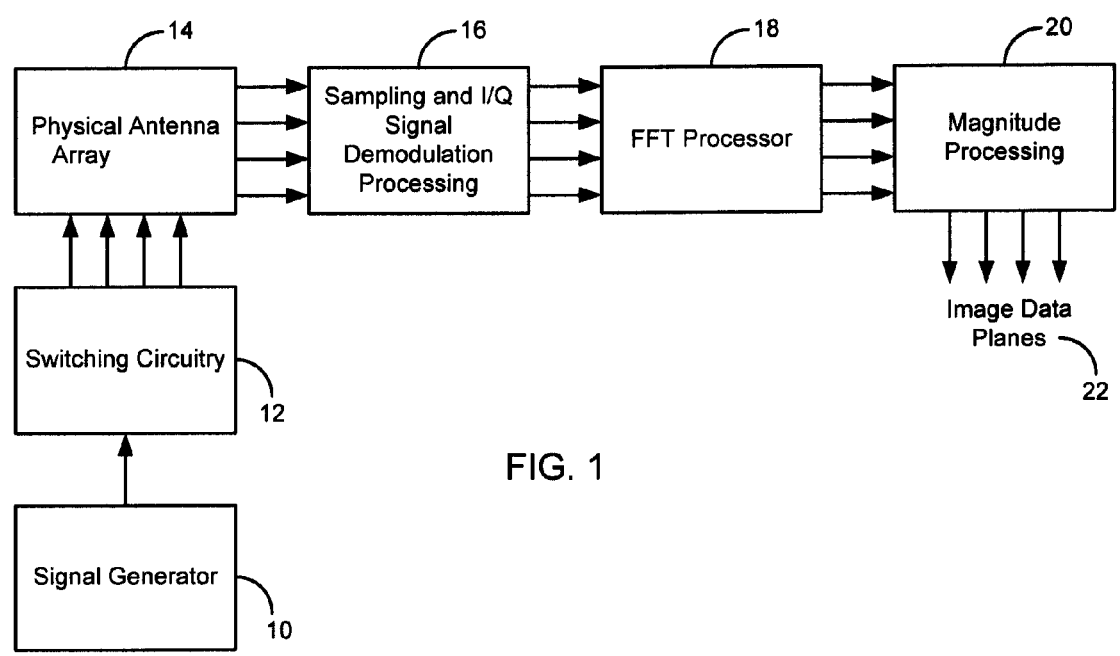
FIG. 1 is a block diagram of a first representative embodiment of a radar system.

FIG. 1 is a block diagram showing certain details of this representative embodiment. Shown are a signal generator 10, switching circuitry 12, a physical antenna array 14, a sampling and I/Q signal-demodulation processor 16, a fast Fourier transform (FFT) processor 18, a magnitude processor 20, and an imager 22. The signal generator 10 is configured to generate a suitable wideband signal for transmission by the antenna array 14. The wideband signal can be any of various types including, but not limited to, long chirp, Costas-coded, Barker-coded, and other signals. The signal desirably has sufficient bandwidth to provide the desired resolution in the range dimension. The switching circuitry 12 is configured to send, in a sequential or other desired ordered manner, the signal to each array element of the antenna 14.

Figure 2:
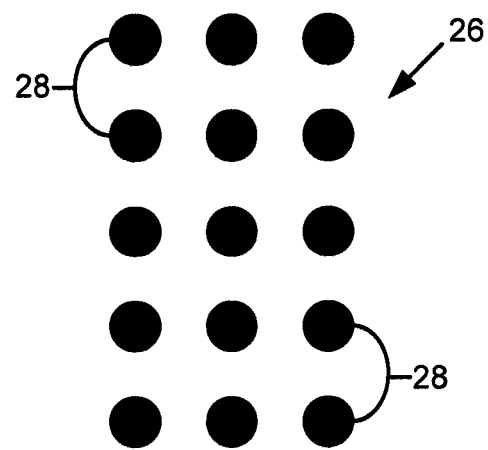
FIG. 2 is a plan view showing an exemplary two-dimensional array of antenna elements. Any row or column of this array is an exemplary one-dimensional array of elements.

In contrast to conventional two-dimensional antenna arrays, all the elements in the antenna 14 are not excited simultaneously. Rather, the elements are excited one at a time. An exemplary planar array 26 of individual elements 28 is shown in FIG. 2. The elements 28 do not include respective phase shifters (conventionally used for steering a real antenna beam) but rather are connected directly to the switching circuitry 12. The switching circuitry 12 energizes the elements 28 individually, one after another, while allowing each element sufficient time to receive before energizing the next element.

The physical antenna array 14 can be of substantially any desired shape or size, and can be single-dimensioned (e.g., a linear arrangement of elements 28) or multi-dimensioned (e.g., and planar or three-dimensional array of elements). Importantly, the individual antenna elements 28 (e.g., dipole radiators) desirably have relatively large (i.e., wide) half-power beamwidths. As noted, after a particular element 28 is excited (so as to transmit its respective wideband signal) the same element is used as a respective receiving antenna to collect the returning signal. As each element 28 transmits and receives, a respective set of received signals is obtained, each having a respective time/range waveform. The sets of received signals are routed to the sampling and I/Q signal-demodulation processor 16, which can comprise actual DSP hardware circuitry or DSP software, or both. The I- and Q-range resolved signals (one respective pair obtained by each antenna element 28) exiting the sampling and I/Q signal-demodulation processor 16 are sorted into range "bins" to form a set of complex iso-range data planes. Each iso-range data plane, being a respective two-dimensional array in the language of signal processing, comprises the complex (I/Q) received signal data values at the particular respective range.

Each complex data plane is used as a respective input to the FFT processor 18, which performs a two-dimensional fast Fourier transform of the complex data plane. The "I" data values area used as the "real" portion of the input to the transform, and the "Q" data values are used as the "imaginary" portion of the input to the transform. For each complex input value, the FFT processor 18 produces a complex output value. The magnitude of this complex value is formed as the square root of the sum of the squared real and imaginary values. Thus, two-dimensional planes of iso-range output data are produced (one for each range). The two-dimensional planes can be imaged by the imager 22 as respective two-dimensional images. Each plane provides an image at a specific range. Optionally, the two-dimensional planes can be "stacked" or otherwise used to form a volume of data in three dimensions (which corresponds to a three-dimensional image). The three-dimensional data can be displayed by the imager 22 in a three-dimensional image format. A two-dimensional image also can be produced by, for example, a one-dimensional antenna array 14. Note that the packing and spacing of the antenna elements 28, as well as the physical dimensions of the entire antenna array 14, can be controlled to affect the quality of both the two-dimensional and three-dimensional data and imagery.

Figure 3:
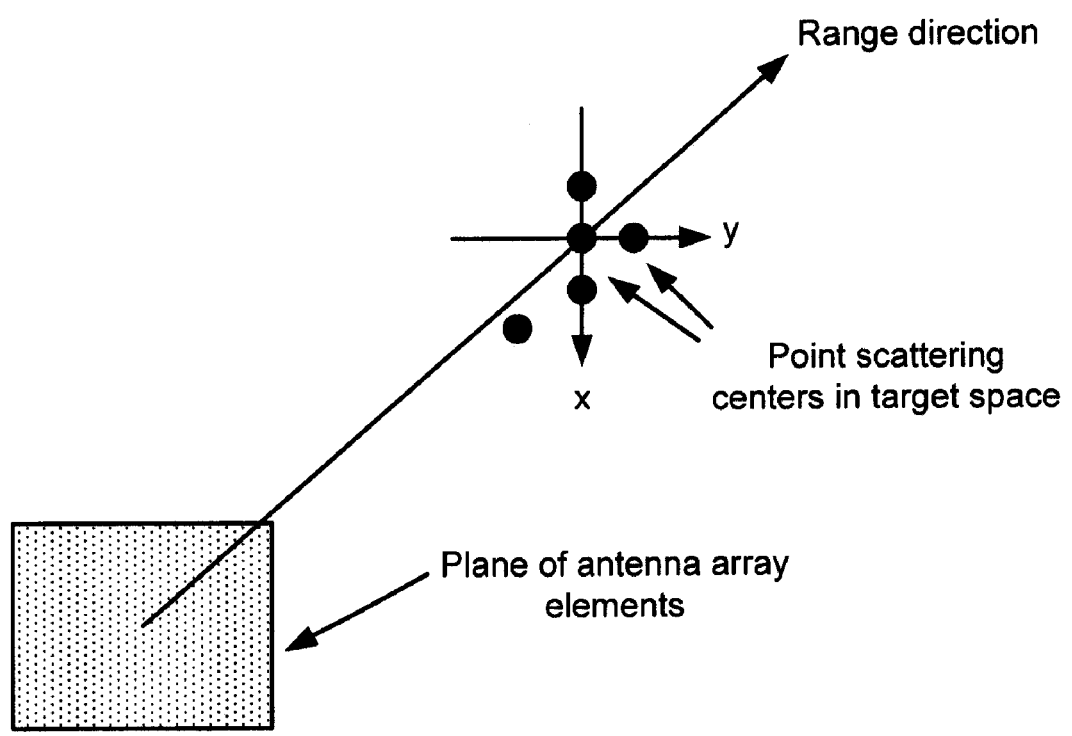
FIG. 3 is a diagram depicting the geometry used in the simulation, showing the plane of antenna elements (grey) and five point-scattering centers in an x-y plane parallel to (and displaced in the z-direction from) the plane of antenna-array elements.
Figure 4:
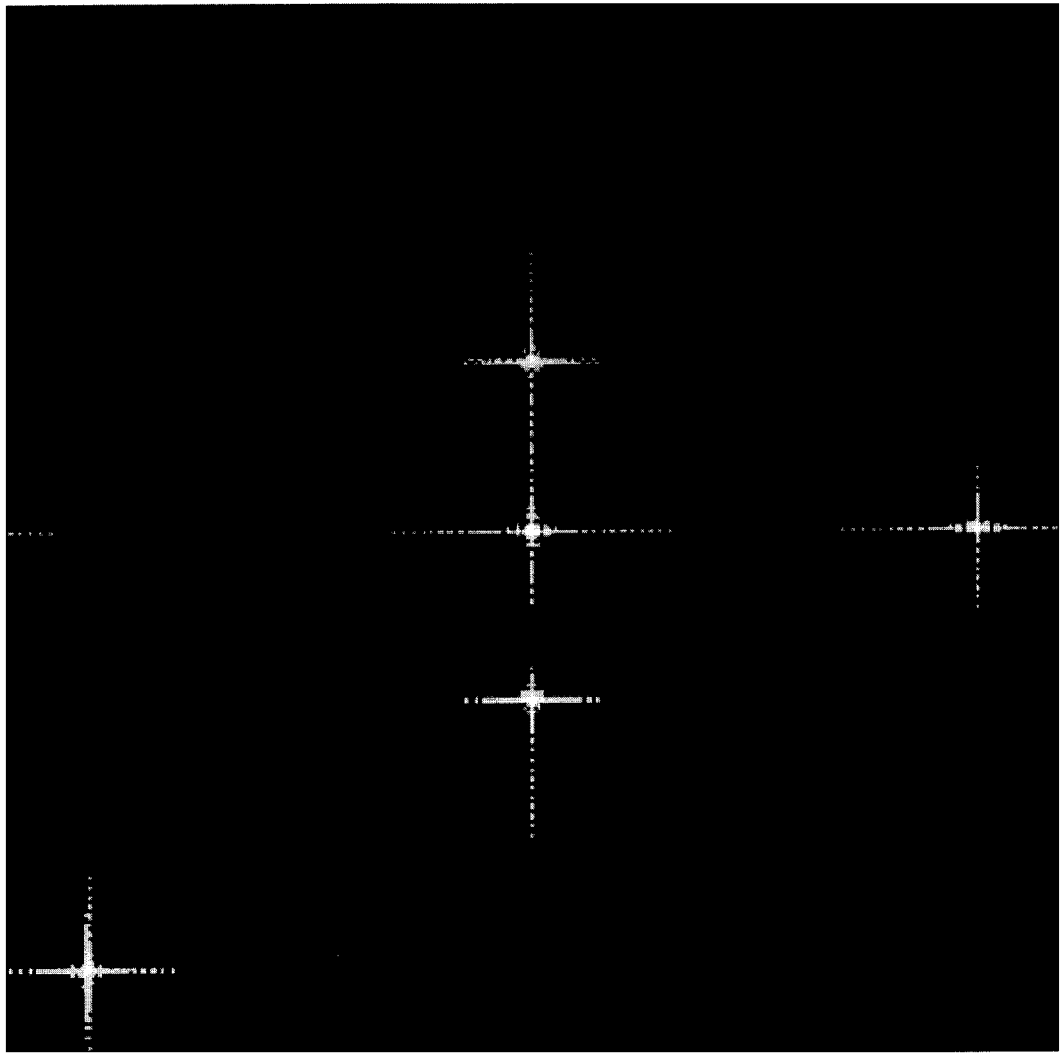
FIG. 4 is an exemplary simulated image of the five point-scattering centers. The image was simulated according to the methods described herein.

Various aspects were investigated using a computer simulation. The simulation was based upon use of a two-dimensional planar array of antenna elements 28. Five ideal isotropic point-scattering centers were placed mathematically in three-dimensional space forwardly of the array, as shown in FIG. 3. The antenna elements 28 were excited one-by-one to form a received signal that was processed as shown in FIG. 1. FIG. 4 shows the resulting simulated (single-range bin) image. Since all the scattering centers were assumed as being at ranges associated with a single-range bin, there were in this case no other image planes.

It will be understood that data processed by the FFT processor 18 and/or magnitude processor 20 can be used for imaging purposes, such as described above. Alternatively, these data can be used directly for any of various control purposes that do not require the production of an image.

Second Representative Embodiment

In this embodiment only one element in the physical antenna array is energized to send a radar signal from the array. The corresponding returning signals are received by all the elements of the array and processed as described in the first embodiment. Computer-simulation experiments show that any antenna element (except the central array element in certain array configurations) can be energized to produce similar results. In this mode, system cross-range resolutions are degraded by approximately 50%. However, the advantage is that only one element need be energized, thereby producing savings in system cost and in the time necessary to produce image data.

Third Representative Embodiment

In this embodiment, the antenna array is operated in a fully passive radiometric mode. That is, no signals are transmitted by the elements of the array. Rather natural electromagnetic emissions of targets provide the signals received by the array elements. The signal received at each antenna element desirably is filtered or otherwise processed to select single frequencies in the received signal. Alternatively, a remote transmitter can be used to illuminate the target or target area. In either case, the single-frequency received signal at each antenna element is subsequently processed as described in the first embodiment. Computer simulation results show that two-dimensional images constructed in this manner can exhibit reduced cross-range resolution. Also, since the array elements are passive, range resolution of the received signals is not possible. Thus, only two-dimensional images currently can be formed. To overcome potential noise-degradation issues and to compensate for lack of signal strength, multiple images can be collected over time and averaged, assuming little or no relative movement between the target area and the array.

Key advantages of various embodiments of the subject radar systems are as follows: (a) They eliminate the need, in conventional systems, of phase-shifters and associated electronics for the antenna elements. (b) The cost of the system is substantially less than of a conventional phased-array system. (c) The cross-range resolution is potentially better than obtained with a conventional phase-array system. (d) The system can be applied to both long-range and near-range radar systems. (e) Two-dimensional images are obtainable using a narrow-band continuous wave (CW) signal. (f) Three-dimensional images are obtainable if wide-band radar signals are transmitted. (g) The systems can be used in a wide range of applications.

Whereas the invention has been described in connection with a representative embodiment, it is not limited to that embodiment. On the contrary, the invention is intended to encompass all modifications, alternatives, and equivalents as may be included in the spirit and scope of the invention, as defined by the subject claims.

What is claimed is:

1. A radar system, comprising:
a signal generator configured to produce energization signals;
an antenna comprising an array of multiple antenna elements;
a switching circuit connected to the signal generator and to the antenna and configured to deliver the energization signals to a selected individual antenna element at a respective moment in time to cause the selected antenna element to transmit a respective radar signal in response to the respective energization signal, wherein at least the respective selected antenna element receives a corresponding return-radar signal before the switching circuit selects a next antenna element to transmit a respective radar signal;
an I/Q sampling and signal-demodulation processor connected so as to receive the return-radar signals from the antenna elements and configured to demodulate the return-radar signals; and
a fast Fourier-transform (FFT) processor connected to the I/Q sampling and signal-demodulation processor and configured to perform fast Fourier transforms of the return-radar signals.

2. The system of claim 1, wherein the corresponding return-radar signal is received by substantially all the antenna elements of the array.

3. The system of claim 1, wherein the next antenna element is different from the selected antenna element.

4. The system of claim 3, wherein the next antenna element is next in a predetermined sequence of elements.

5. The system of claim 3, wherein the switching circuit is further configured to allow the corresponding return-radar signal to be received by multiple antenna elements of the array before an energization signal is sent to the next antenna element.

6. The system of claim 1, wherein:
the next antenna element is the same as the selected antenna element; and
the switching circuit is configured to send respective energization signals to the same antenna element at respective moments in time.

7. The system of claim 6, wherein the switching circuit is further configured to allow the corresponding return-radar signal to be received by multiple antenna elements of the array before a subsequent energization signal is sent to the same antenna element.

8. The system of claim 1, further comprising a magnitude processor connected to the FFT processor and configured to determine, from the Fourier transforms, respective magnitudes of the return-radar signals in at least one respective data plane.

9. The system of claim 8, wherein the magnitude processor is configured to determine, from the Fourier transforms, respective magnitudes of the return-radar signals in multiple respective data planes.

10. The system of claim 1, wherein the switching circuit is configured to deliver energization signals one at time in an ordered manner to energize the antenna elements and cause them to transmit their respective radar signals at respective moments in time.

11. The system of claim 10, wherein the switching circuit is configured to energize the antenna elements in the array in a sequential manner.

12. The system of claim 1, wherein a respective return-radar signal is received by an energized antenna element before a next antenna element of the array receives a respective energization signal from the switching circuit.

13. The system of claim 1, wherein the array of elements of the antenna is one-dimensional.

14. The system of claim 1, wherein the array of elements of the antenna is multi-dimensional.

15. The system of claim 1, wherein each antenna element is a respective dipole radiator having a relatively wide half-power beamwidth.

16. The system of claim 1, wherein the I/Q sampling and signal-demodulation processor is configured:

to produce, from the respective return-radar signals received by the antenna elements, respective I and Q range-resolved signals; and to sort the I and Q range-resolved signals into range bins to form a set of complex iso-range data planes each holding respective complex (I/Q) received data values at the respective range.

17. The system of claim 16, wherein the FFT processor is configured:

to receive the iso-range complex-data planes; and to perform a two-dimensional fast-Fourier transform of the respective data values in the received complex-data planes.

18. The system of claim 17, wherein the FFT processor is further configured to use, while performing the fast-Fourier transforms, "I" data values as corresponding "real" input portions, and "Q" data values as corresponding "imaginary" input portions.

19. The system of claim 18, wherein the FFT processor is further configured to produce, for each complex input value, a corresponding complex output value having a magnitude formed as a square root of a sum of squared real and imaginary values, thereby producing two-dimensional planes of output data, one respective plane for each range.

20. The system of claim 19, further comprising a magnitude processor connected to the Fourier-transform processor, the magnitude processor being configured to determine, from the Fourier transforms, respective magnitudes of the return-radar signals in at least one respective data plane.

21. The system of claim 20, further comprising an imager connected to the magnitude processor, the imager being configured to receive at least one data plane from the magnitude processor and to produce therefrom a multi-dimensional image.

22. The system of claim 21, further comprising an imager connected to the magnitude processor, the imager being configured to receive multiple planes of output data and to produce a three-dimensional image from said data.

23. A radar system, comprising:

antenna means for transmitting radar signals and for receiving returning radar signals, the antenna means comprising an array of multiple antenna elements;

signal-generation means for producing antenna-element-energization signals;

switching means for delivering the energization signals to a selected individual antenna element at a respective moment in time to cause the selected antenna element to transmit a respective radar signal in response to the respective energization signals and at least the respective selected element to receive a corresponding return-radar signal;

signal-sampling means for demodulating the respective return-radar signals received by the antenna elements; and processor means for performing Fourier transforms of the return-radar signals.

24. The system of claim 23, further comprising magnitude-processing means for receiving the Fourier transforms and for determining, from the Fourier transforms, respective magnitudes of the return-radar signals in at least one respective data plane.

25. The system of claim 23, further comprising magnitude-processor means for determining, from the Fourier transforms, respective magnitudes of the return signals in at least one respective data plane.

26. The system of claim 25, further comprising imaging means for receiving at least one data plane and for producing an image from the at least one data plane.

27. A method for performing radar, comprising:

generating a series of respective energization signals at different respective moments in time;

delivering the energization signals selectively to individual respective antenna elements in an array of such elements to cause the energized antenna elements to transmit the respective radar signals at the respective moments in time;

receiving return-radar signals by one or more of the antenna elements, each return-radar signal being received before a next antenna element transmits its respective radar signal;

I/Q sampling and demodulating the return-radar signals; and performing Fourier transforms of the demodulated return-radar signals.

28. The method of claim 27, wherein the next antenna element is the same antenna element of the array.

29. The method of claim 27, wherein the next antenna element is a different antenna element of the array.

30. The method of claim 27, further comprising imaging the Fourier-transformed return-radar signals.

31. The method of claim 30, wherein imaging the Fourier-transformed return-radar signals comprises:

determining respective magnitudes of the return-radar signals in at least one data plane; and imaging the at least one data plane.

32. The method of claim 27, wherein:

the energization signals are delivered to respective antenna elements one at a time in an ordered manner; and the return-radar signals are received by the respective antenna elements one at a time in the ordered manner.

33. The method of claim 27, wherein the step of I/Q sampling and demodulating the return-radar signals further comprises:

producing respective I and Q range-resolved signals; and sorting the I and Q range-resolved signals into range bins to form a set of complex iso-range data planes each holding respective (I/Q) received data values at the respective range.

34. The method of claim 33, wherein the step of performing Fourier transforms further comprises performing multi-dimensional fast-Fourier transforms of respective data values in the complex iso-range data planes.

35. The method of claim 34, wherein the step of performing Fourier transforms further comprises producing, for each of a series of complex input values, a corresponding complex output value having a respective magnitude formed as a square root of a sum of squared real and imaginary values, thereby producing two-dimensional planes of output data, one respective plane for each range.

36. The method of claim 35, further comprising imaging the planes of output data by receiving multiple planes of output data, and producing a multi-dimensional image from said data.

* * * * *